Figure 6:
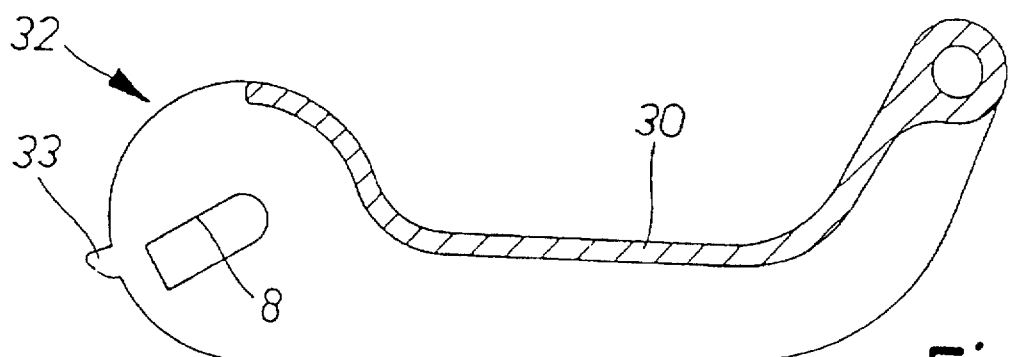

United States Patent [19]

Vairinen

[11] Patent Number: 5,725,281
[45] Date of Patent: Mar. 10, 1998

[54] ADJUSTING MECHANISM FOR A SUPPORT ELEMENT INCLUDED IN A SEAT AND PIVOTABLE IN THE VERTICAL PLANE

[75] Inventor: Erkki Vairinen, Yliskulma, Finland

[73] Assignee: Jukova Oy, Yliskulma, Finland

[21] Appl. No.: 798,286

[22] Filed: Feb. 7, 1997

Related U.S. Application Data

[62] Division of Ser. No. 436,319, filed as PCT/FI93/00489, Nov. 18, 1993.

[30] Foreign Application Priority Data

Nov. 20, 1992 [FI] Finland ................... 925275

[51] Int. Cl.⁶ ................ A47C 7/50; A47C 20/04
[52] U.S. Cl. ................ 297/423.26; 297/423.35; 403/93; 403/116
[58] Field of Search ............... 297/423.28, 423.24, 297/423.35, 423.26, 423.3; 403/93, 72, 105, 116, 73

[56] References Cited

U.S. PATENT DOCUMENTS

| | | | |
|---|---|---|---|
| 1,712,266 | 5/1929 | Grimmich | 297/423.35 |
| 2,175,488 | 10/1939 | Stoll | |
| 2,310,346 | 2/1943 | Bell | |
| 2,411,063 | 11/1946 | Scott | |
| 3,779,655 | 12/1973 | Toyota | 403/93 |
| 4,577,986 | 3/1986 | Wang | 403/93 |
| 4,657,305 | 4/1987 | Meiller | |
| 4,668,010 | 5/1987 | Fujiwara | |
| 4,824,278 | 4/1989 | Chang | 403/93 |
| 4,848,840 | 7/1989 | Toya | |
| 5,316,373 | 5/1994 | Markel | 297/411.32 |

FOREIGN PATENT DOCUMENTS 1198396 12/1959 France .................... 297/357

*Primary Examiner*—Peter M. Cuomo
*Assistant Examiner*—Anthony D. Barfield
*Attorney, Agent, or Firm*—Joan H. Pauly

[57] ABSTRACT

An adjusting mechanism is adapted for use with a footrest mounted in front of a seat, and a fulcrum pin to facilitate pivotable fixing of the footrest. A fastening member adapted to be included in the footrest has a pair of elongated openings for the pin. A spring biased bushing is provided at a first end of each opening and is adapted for relative movement in the longitudinal direction of the openings toward a second end of each opening. First and second guiding and locking elements are included, respectively, in the fastening member and in a fastening element through which the pin extends. Pivoting the footrest is effected by shifting it in the longitudinal direction of the openings against the spring bias toward the fulcrum pin to release the guiding and locking elements. When the footrest has been pivoted to a desired locking position, the spring bias returns it to a position in which the bushings are at the first opening ends and the guiding and locking elements are engaged. The fastening element has two take-up recesses and a locking shoulder on a back wall of each recess. The fastening member has a shaft with a forked end that is received in the take-up recesses. Each leg of the forked end has a locking cam that cooperates with the corresponding locking shoulder.

4 Claims, 4 Drawing Sheets

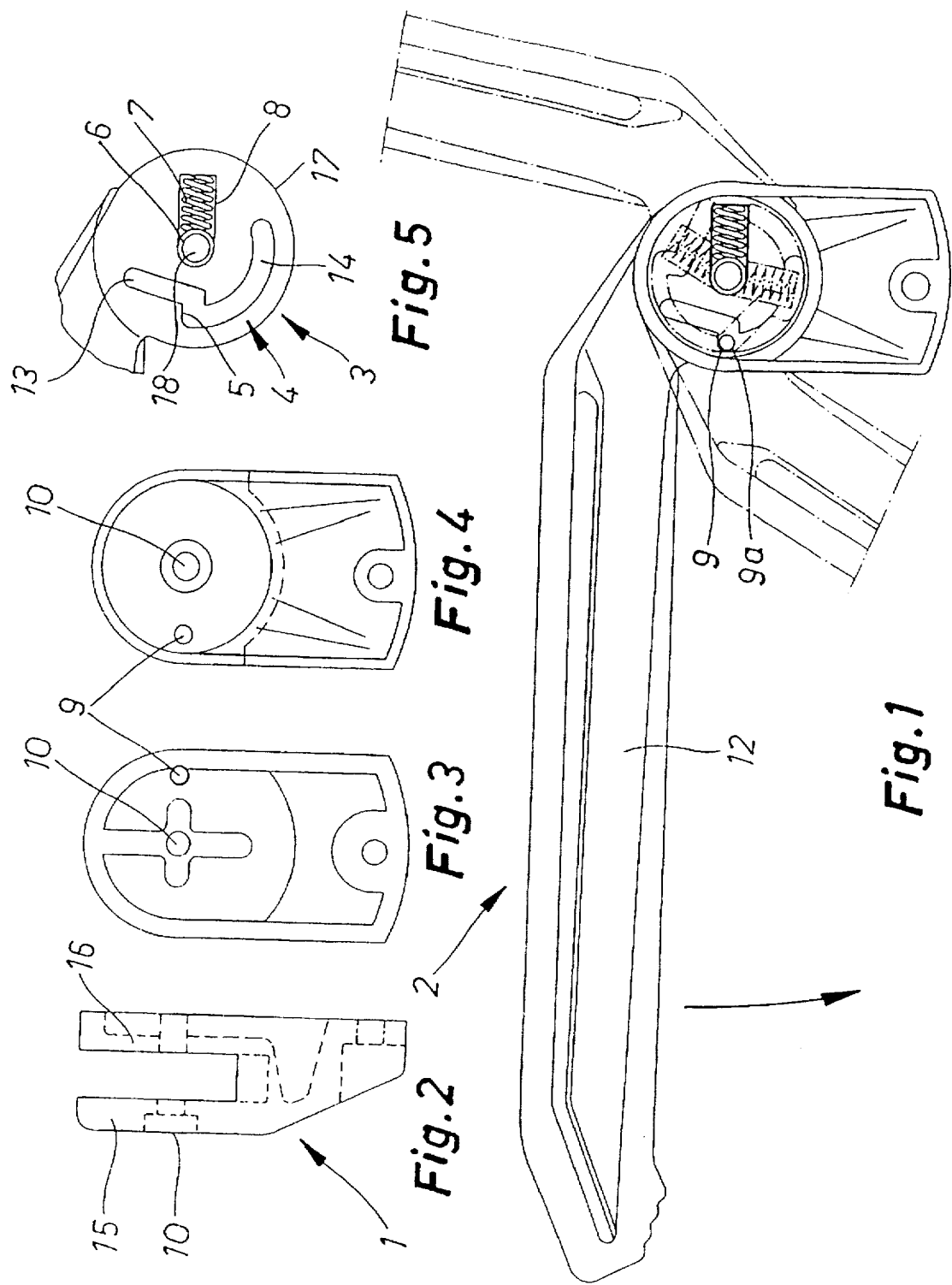

ADJUSTING MECHANISM FOR A SUPPORT ELEMENT INCLUDED IN A SEAT AND PIVOTABLE IN THE VERTICAL PLANE

This application is a division of application Ser. No. 08/436,319, filed as PCT/FI93/00489, Nov. 18, 1993.

The present invention relates to an adjusting mechanism for a support element included in the seat of a vehicle or a like and pivotable in the vertical plane, said mechanism comprising a fastening element to be mounted on a seat or a separate body member and provided with a through-hole for a fulcrum pin facilitating the pivotable fixing of said support element, and a fastening member included in the support element and provided with a through-going opening for said fulcrum pin.

An object of the present invention is to provide an improved adjusting mechanism for effecting said pivoting movement occurring in the vertical plane and for adjusting said support element, such as e.g. an armrest included in the seat of a bus or a footrest fitted behind the preceding seat in the bottom portion thereof, to a desired pivoted position, said improvement providing a support element adjustment which is simpler and more reliable than before. This type of adjusting mechanism is necessary for adapting the position of a footrest included e.g. in the seat of a bus, a train or a ship for the needs of people of varying sizes and for pivoting or turning an armrest included in the seat out of the way for getting in and out of the seat more easily. This type of adjusting mechanism is particularly useful in connection with seats having a declinable back, whereby the armrest or footrest is adjustable in relation to the inclination of the back. The possible seats may also comprise e.g. office chairs and seats of various public facilities, such as theatre seats.

In order to achieve the above object, a mechanism of the invention is characterized in that the opening included in the fastening member is made elongated and one end thereof is provided with a bushing receiving said fulcrum pin and adapted for a relative movement in the longitudinal direction of the opening towards the other end of the opening; that the opening is further provided with a spring member applying an impulsive force between bushing and fastening member; and that the fastening member is further provided with guiding/locking elements which are in cooperation with respective guiding/locking elements included in the fastening element with the bushing located at said one end and loaded by the spring member, the pivoting of the support element to a desired position being effected by shifting the support element in the longitudinal direction of the opening against the action of the spring member towards the fulcrum pin remaining stationary relative to the fastening element, said guiding/locking elements being released from the relative engagement thereof facilitating the pivoting motion of the support element to a desired locking position, wherein the spring member forces the support element back to a position in which said bushing is again at said one end of the opening and said guiding/locking elements are in relative engagement.

According to one aspect of the invention, an adjusting mechanism of the invention is characterized in that the support element comprises an armrest included in a seat, and that said guiding/locking elements comprise a guide slot formed in the armrest fastening member and provided with at least one arrest shoulder located between the extreme ends of the slot, and a guide/locking member which is included in the fastening element and movable relative to said slot and engageable with said locking shoulder for locking the armrest in a desired pivoted position.

According to another aspect of the invention, an adjusting mechanism of the invention is characterized in that the support element comprises a footrest mounted in front of a seat, on the bottom section of a preceding seat or some other supporting structure, that the fastening element comprises a body member including two take-up recesses, the bottom or back wall of said recesses being provided with at least one locking shoulder, and that the footrest fastening member comprises a body element, which is provided at one end with an actual footrest element, the other end of said body element being provided with a forked end member, whose legs are each provided with said elongated opening including its spring member and bushing, each of said legs being intended to be received in one of said take-up recesses included in the fastening element, the free end of each leg being further provided with a locking cam which is in cooperation with said at least one locking shoulder included in a corresponding recess.

Figure 7:
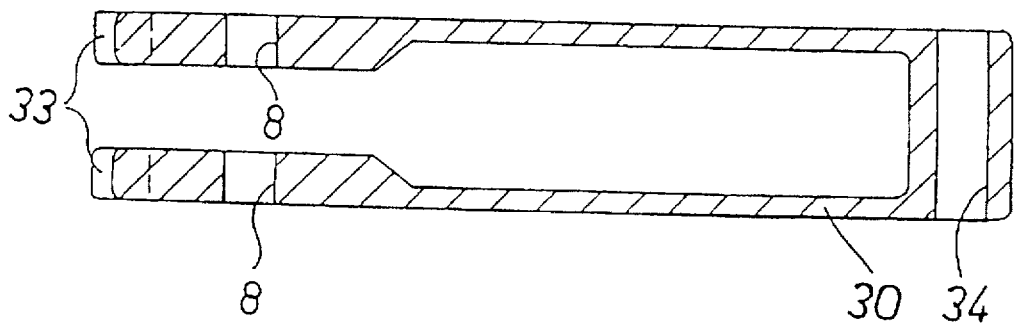
Figure 11:
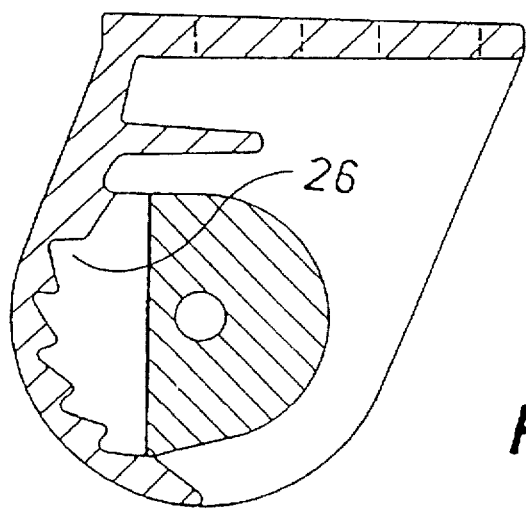
Figure 8:
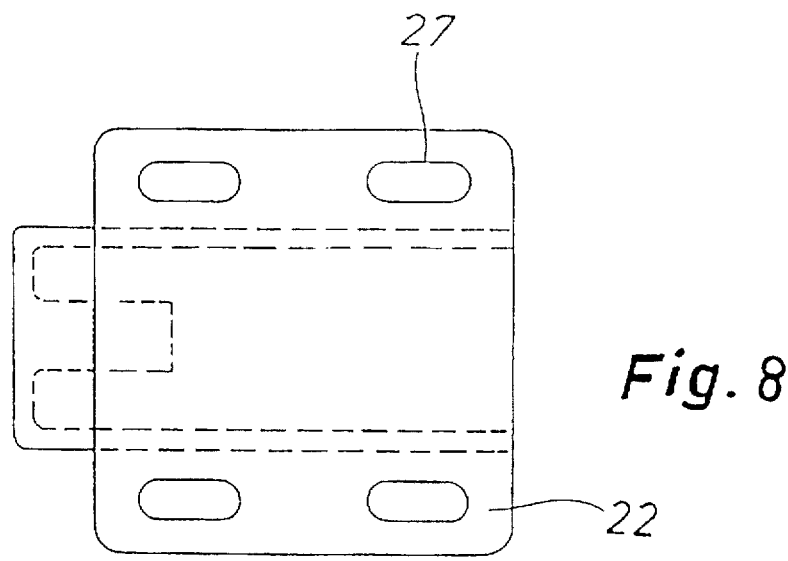
Figure 9:
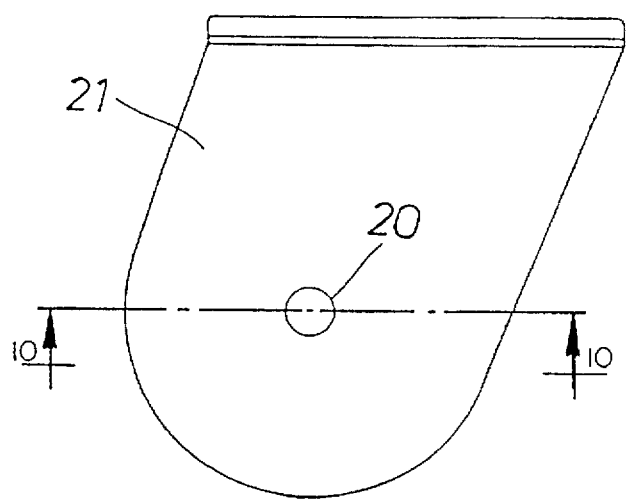
Figure 10:
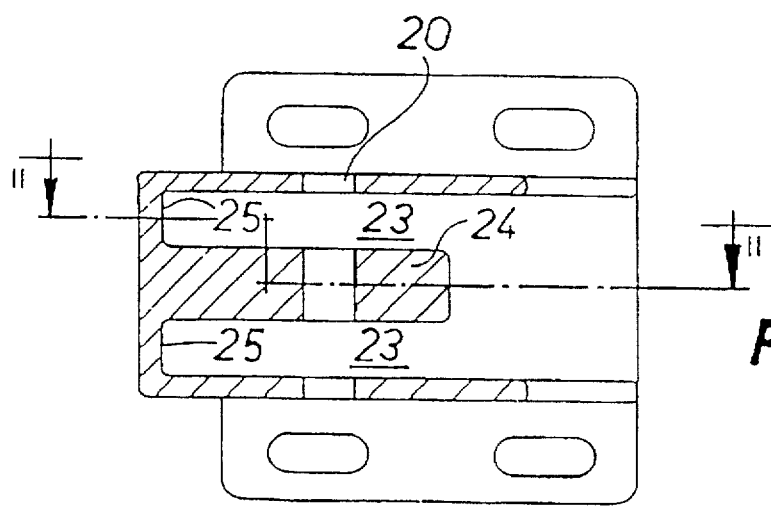
Figure 13A:
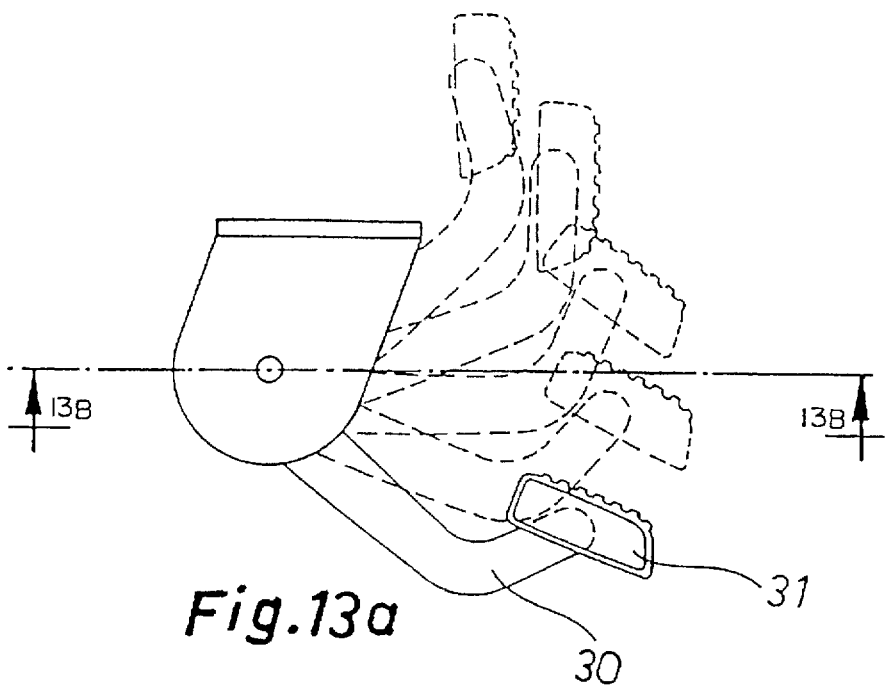
Figure 13B:
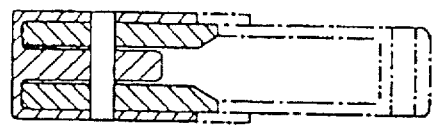
Figure 12:
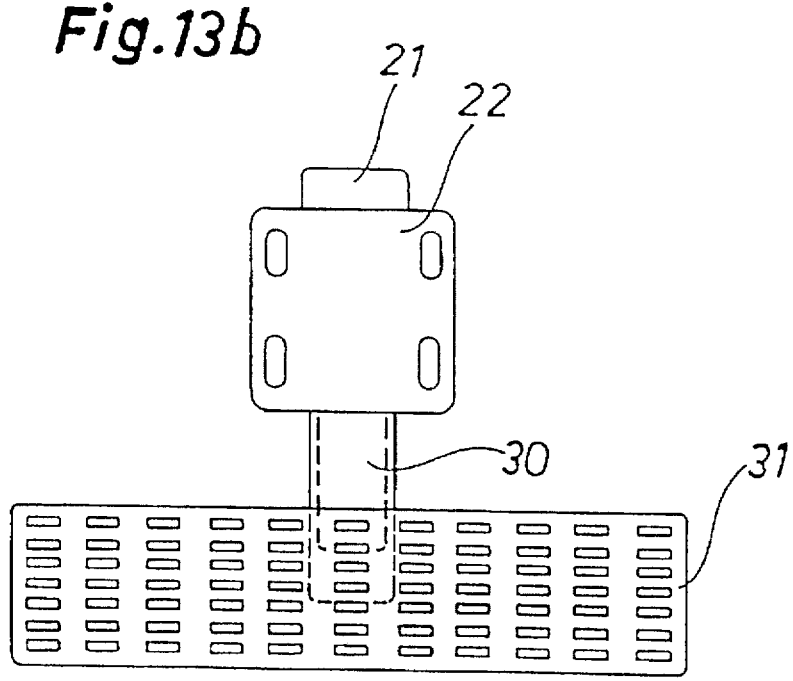

The invention will now be described with reference made to the accompanying drawings, which depict some preferred exemplary embodiments for the invention but the invention is by no means limited to these examples:

FIG. 1 is a schematical view of one embodiment for an adjusting mechanism of the invention applied in an armrest, FIGS. 2–4 illustrate a fastening element for use in the mechanism of FIG. 1 in a side, rear and front view, respectively, FIG. 5 is a more detailed view of an armrest fastening member, FIG. 6 is a partially cut-away side view of one embodiment for an adjusting mechanism of the invention in connection with a footrest, FIG. 7 is a section along a line VI—VI in FIG. 6, FIG. 8 shows a plan view of a fastening member for use in connection with the embodiment of FIGS. 6 and 7, FIG. 9 shows a side view of the fastening of FIG. 8, FIG. 10 shows the fastening member of FIG. 8 along a line X—X in FIG. 9, FIG. 11 shows a section along a line XI—XI in FIG. 10, FIG. 12 shows the embodiment of FIGS. 6–11 in the form of an assembled unit, FIG. 13a shows the assembly of FIG. 12 in a side view illustrating the different adjusting positions for a footrest, and FIG. 13b shows a section along a line A—A in FIG. 13a.

As shown in FIGS. 1–5, an armrest adjusting mechanism of the invention includes a fastening element 1 to be affixed to a seat or some other supporting structure and provided with a fork member, having an opening 11 between and parallel to its legs 15, 16. Through the legs extends a trasverse hole 10, intended for a fulcrum pin (not shown).

The legs are further provided with another hole or recess 9 for fitting a guide member 9a, intended to function in cooperation with a guide slot 4 formed in a fastening member 3 to be fitted in opening 11 included in the fastening element of an armrest 2. As best shown in FIG. 5, said fastening member 3 includes a substantially circular rim portion 17, whose central area is provided with an elongated through-going opening 8. Inside the opening 8 is fitted a bushing 6, retained in position at one end of opening 8 by means of a compression spring 7. In a normal condition, said bushing 6 is compressed against the inner end wall of opening 8 and it is adapted to be movable relative to opening 8 in the longitudinal direction of opening 8 against the action of compression spring 7. A fulcrum pin (not shown) is set to extend through the bushing 6. The fastening member 3 is further provided with a previously mentioned guide slot 4, which in this embodiment forms a substantially sickle-shaped path. The junction of a substantially circular arc shaped sickle section 14 and a substantially straight handle section 13 is provided with an arrest shoulder 5 with a guide member 9a abutting against it upon turning or pivoting said armrest 2 to its flat or horizontal position. The guide member 9a may comprise a spring cotter or a helical screw or some other appropriate pin member extending through said slot 4. The guide slot 4 need not necessarily be a through-going slot, in which case a guide member is respectively included in just one of the legs 15 and 16 of a fastening element. The opening 8 is preferably adapted to extend outwards from the centre 18 of member 3 while the guide slot 4 is preferably located on the opposite side of the centre adjacent to rim portion 17, such that said substantially circular arc shaped section 14 has the same centre as rim portion 17. The arrest shoulder 5 included in guide slot 4 is adapted to lie longitudinally in alignment with the longitudinal direction of opening 8, whereby it is possible to shift the armrest forward in its longitudinal direction at the time said guide member 9a is located at arrest shoulder 5. Thus, the arrest shoulder 5 is shifted relative to guide member 9a and the opening 8 is shifted relative to bushing 6 held stationary by a fulcrum pin.

In operation, the armrest 2 is pivoted e.g. downwards from the upright position of FIG. 1, the fastening member 3 pivoting around a fulcrum pin and the arched portion 14 of slot 4 traveling past guide member 9a until shoulder 5 abuts against said guide member 9a. At this time, the pivoting motion stops and the armrest is in its flat position. If the purpose is to continue the pivoting movement further downwards, the armrest is shifted forward whereby said fastening member 3, together with its opening 8, shifts relative to bushing 6 held stationary by the fulcrum pin against the action of spring 7 bringing the straight section 13 of guide slot 4 into alignment with guide member 9a for making said downward pivoting possible. The straight section 13 of guide slot 4 is preferably located closer to the centre of fastening member 3 than the arched section 14 in a manner that, with the armrest in its bottom position, said spring member 7 is more effectively compressed preventing the armrest from swinging.

Upon turning the armrest 2 from its bottom position back upwards, the straight section of guide slot 4 shifts relative to guide member 9a and, as the arrest shoulder 5 reaches the alignment with guide member 9a, said spring 7 urges the fastening member 3 and thus the entire armrest away from bushing 6 (i.e. the armrest shifts towards fastening element 1), whereby said guide member 9a sets itself against arrest shoulder 5 locking the armrest in its flat position against the downward pivoting. The upward pivoting is not restricted at all in this position.

The guide slot 4 can also be provided with a plurality of arrest shoulders in view of locking the armrest in several different intermediate positions. This is preferred e.g. in such a case that the armrest is attached to the declinable back of a seat.

FIGS. 6–13 illustrate the application of an adjusting mechanism of the invention in connection with a footrest. In this embodiment, the fastening element comprises a body member 21 provided with a plate member 22 including holes 27 for fastening it to a seat or a separate supporting structure. The body member 21 is provided with two take-up recesses 23, each having a bottom or back wall 25 provided with at least one locking shoulder 26. Through body member 21 extends a transverse hole 20 for a fulcrum pin (not shown). The footrest consists of a shaft member 30, one end of which is provided with an actual footrest 31 which is preferably hinged relative to shaft member 30. In view of this hinging arrangement, one end of shaft member 30 is provided with bearing hole 34 for a journal (not shown). The other end of shaft member 30 is designed as a forked end member 32, the legs of said end member being each provided with an elongated opening 8 which is fitted with a bushing 6 and a spring member 7 (not shown in FIGS. 6–13). Each leg of end member 32 is intended to be received in one of said take-up recesses 23 included in fastening element 21. The free end of each leg is provided with a locking cam 33 which is in cooperation with said at least one locking shoulder 26 included in a corresponding recess 23. There are preferably several locking shoulders included in the bottom portion 25 of each leg, whereby the footrest is pivotable to several different pivoted positions, as illustrated in FIG. 13.

The function of a footrest corresponds to what is described in connection of an armrest. If locking cams 33 and locking shoulders 26 are designed e.g. as shown in FIGS. 6 and 11, the footrest can be pivoted upwards without any preceding shifting movement in the longitudinal direction of opening 8 towards bushing 6. This shifting movement is achieved by the cooperation of cam 33 and shoulder 26 during said pivoting motion. However, the downward pivoting of a footrest is prevented by the locking of cam 33 against shoulder 26 and the downward pivoting requires that a shifting movement be effected in the longitudinal direction of opening 8. This arrangement makes the use of a footrest simple and reliable. If desired, said recesses 26 and/or cams 33 can also be designed in a manner that the upward pivoting requires said longitudinal shifting movement.

A footrest adjusting mechanism can also be designed e.g. in a manner that each end of a rest element 31 is provided with a shaft member designed, as shown e.g. in FIGS. 6–13 or e.g. in FIGS. 1–5 or some other way obvious for a skilled person, by utilizing, in accordance with the invention, an elongated opening 8 and a spring member 7 and a bushing 6 included therein.

The above embodiments are described only as examples of preferred ways of carrying out the invention and are by no means intended to limit the scope of protection as defined by the annexed claims.

I claim:

1. In an adjusting mechanism for a footrest (30, 31) mounted in front of a seat, on a bottom section of a preceding seat or some other supporting structure, and pivotable in the vertical plane, said mechanism being of a type having a fastening element (21) adapted to be mounted on a seat or a separate body member and provided with a transverse through-hole (20) for a fulcrum pin to facilitate the pivotable fixing of the footrest (30, 31), and a fastening member (32) adapted to be included in the footrest (30, 31) and provided with a through-going opening (8) for said fulcrum pin, the improvement comprising:

a pair of said openings (8) for said fulcrum pin, each said opening (8) being elongated and having a first end and a second end;

a bushing (6) provided at said first end of each said opening (8) for receiving said fulcrum pin, said bushing being adapted for a relative movement in the longitudinal direction of said opening (8) towards said second end of said opening (8);

a spring member (7) applying an impulsive force between each said bushing (6) and the fastening member (32); and first guiding and locking elements (33) included on the fastening member (32), and second guiding and locking elements (26) included in said fastening element (21).

said first and second guiding and locking elements (33, 26) being in cooperation with each other with said bushings (6) located at said first ends and loaded by said spring members (7), wherein the pivoting of said footrest (30, 31) to a desired position being effected by shifting said footrest (30, 31) in the longitudinal direction of said openings (8) against the action of said spring members (7) towards the fulcrum pin which remains stationary relative to said fastening element (21), said guiding and locking elements (33, 26) being released from the relative engagement thereof for facilitating the pivoting motion of said footrest (30, 31) to a desired locking position, wherein the spring members (7) are adapted to force said footrest (30, 31) back to a position in which said bushings (6) are again at said first ends of said openings (8) and said guiding and locking elements (33, 26) are in relative engagement;

said fastening element (21) comprising a body member including two take-up recesses (23), and at least one locking shoulder (26) on a back wall (25) of each said recess (23); and said fastening member (32) comprising a shaft member (30), which is provided at one end with an actual footrest element (31) and at another end with a forked end member (32) having a pair of legs, said elongated openings (8) being formed in said legs, and each of said legs being positioned to be received in one of said take-up recesses (23), each said leg having a locking cam (33) on a free end thereof, said cam being in cooperation with said at least one locking shoulder (26).

2. An adjusting mechanism as set forth in claim 1, wherein said locking shoulders (26) are arranged essentially along a section of a circular arc.

3. An adjusting mechanism as set forth in claim 2, wherein at least one of said locking shoulders (26) and said locking cams (33) are designed in a manner that upward pivoting of said footrest element (31) can be effected directly without any preceding shifting movement in the longitudinal direction of said openings (8) while downward pivoting motion requires that shifting movement be effected first.

4. An adjusting mechanism as set forth in claim 1, wherein at least one of said locking shoulders (26) and said locking cams (33) are designed in a manner that upward pivoting of said footrest element (31) can be effected directly without any preceding shifting movement in the longitudinal direction of said openings (8) while downward pivoting motion requires that shifting movement be effected first.

* * * * *

UNITED STATES PATENT AND TRADEMARK OFFICE
CERTIFICATE OF CORRECTION

PATENT NO: 5,725,281

DATED: March 10, 1998

INVENTOR(S): Erkki Vairinen

It is certified that error appears in the above-identified patent and that said Letters Patent is hereby corrected as shown below:

Column 2, line 51, "trasverse" should be --transverse--.

Claim 1, column 5, line 5, "being" should be -- is --.

Signed and Sealed this

Twenty-fifth Day of August, 1998

BRUCE LEHMAN

*Attest:*

*Attesting Officer*    Commissioner of Patents and Trademarks